E. J. O'LEARY.
MILKING APPARATUS.
APPLICATION FILED MAY 31, 1919.
1,387,510. Patented Aug. 16, 1921.
4 SHEETS—SHEET 2.
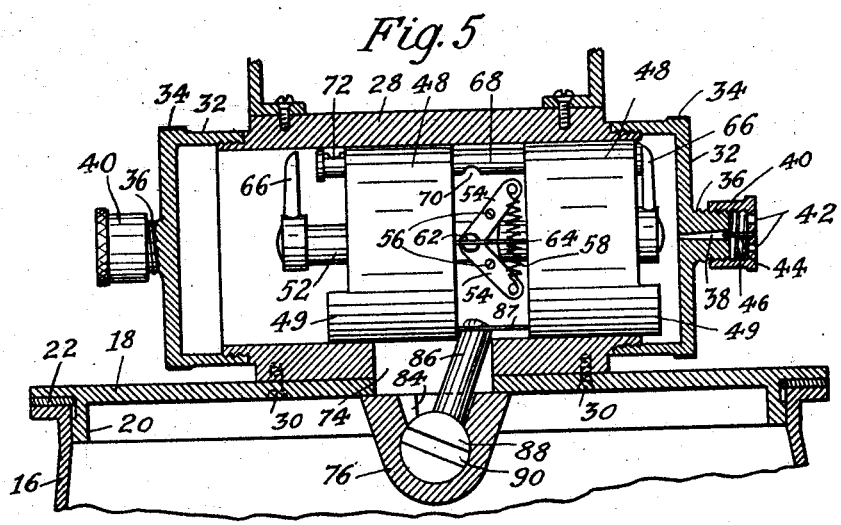
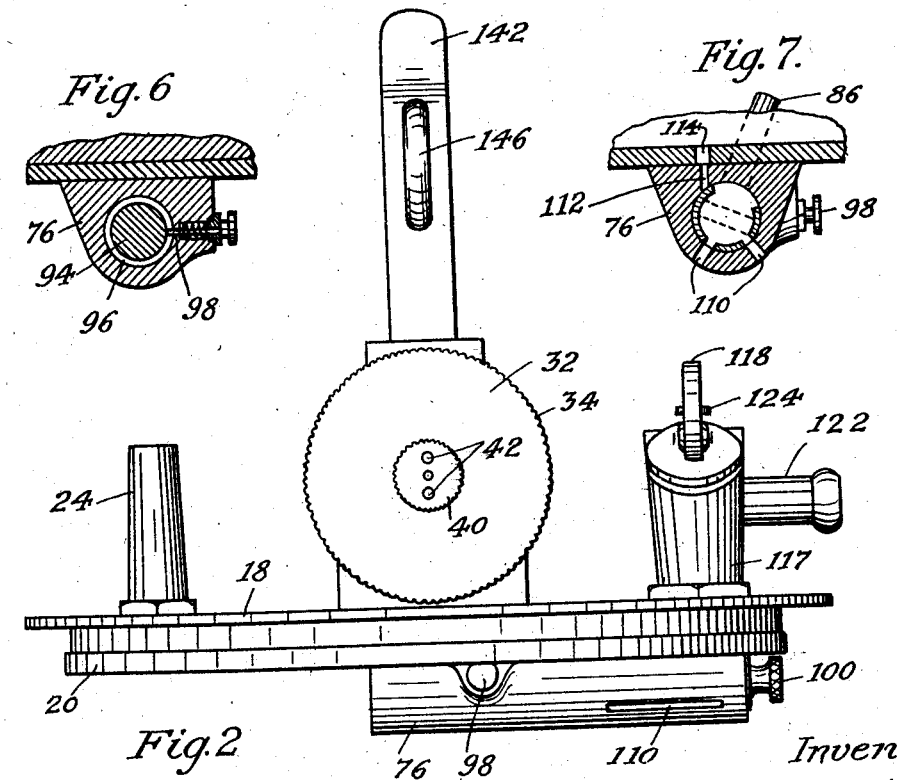
Inventor:
Edward J. O'Leary
By Whiteley and Ruckman
his Attorneys.

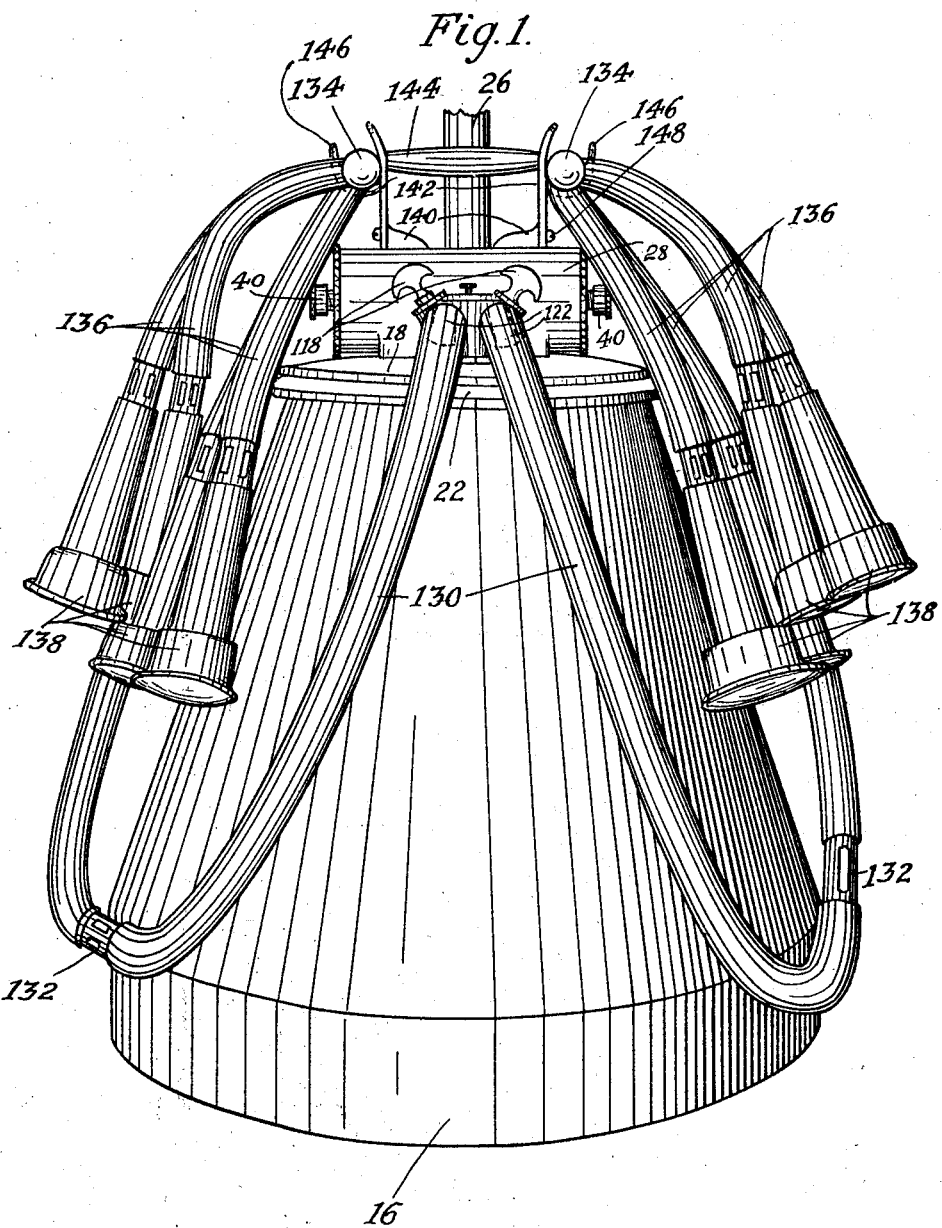

E. J. O'LEARY.
MILKING APPARATUS.
APPLICATION FILED MAY 31, 1919.
1,387,510.
Patented Aug. 16, 1921.
4 SHEETS—SHEET 3.
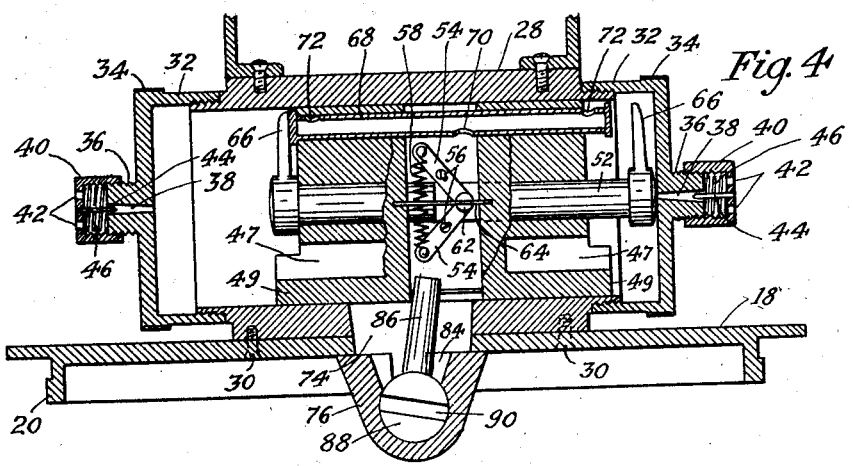
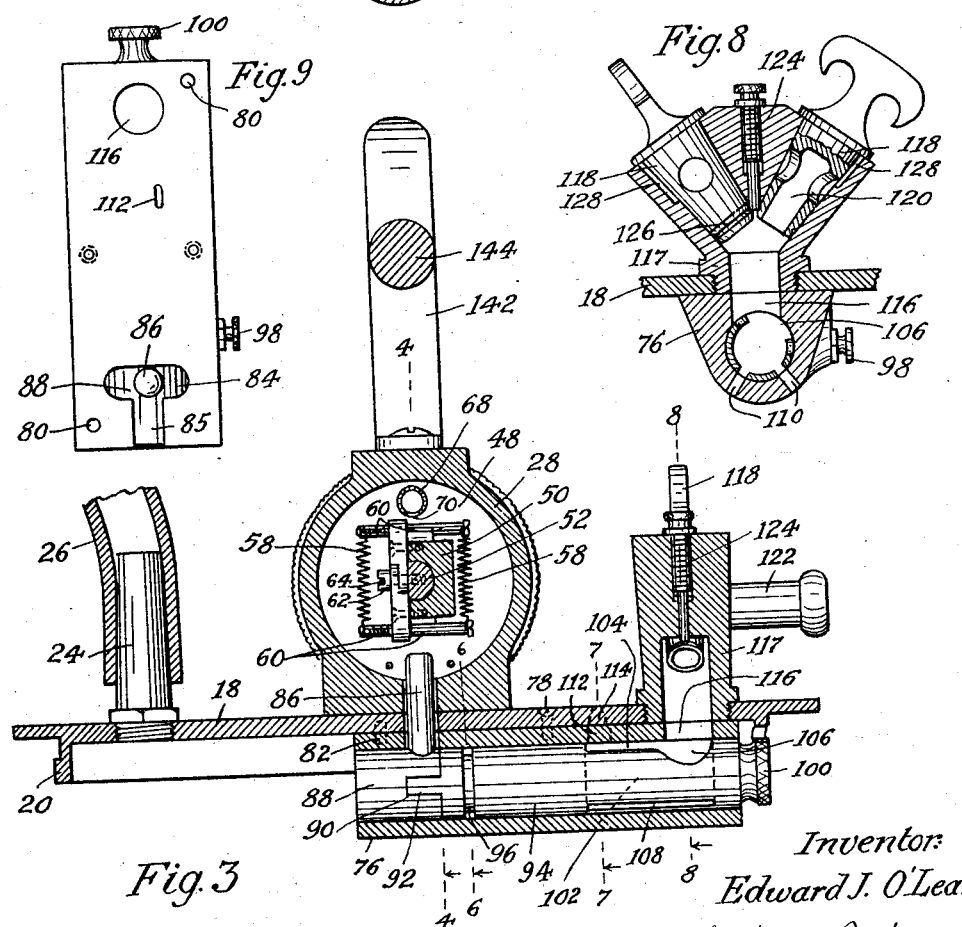
Inventor:
Edward J. O'Leary
By Whiteley and Ruckman
his Attorneys.

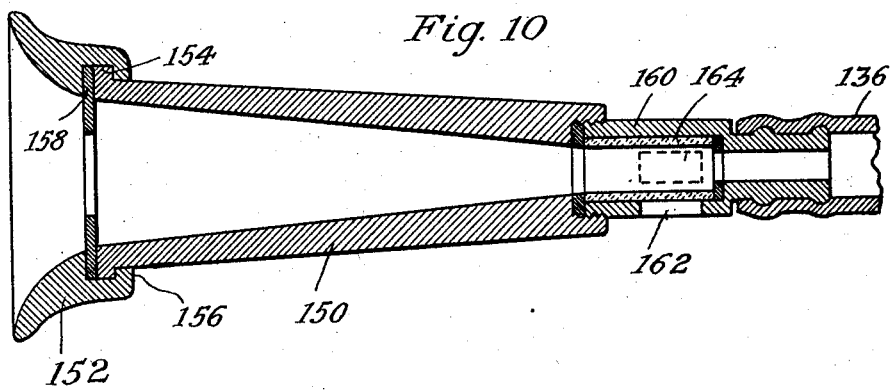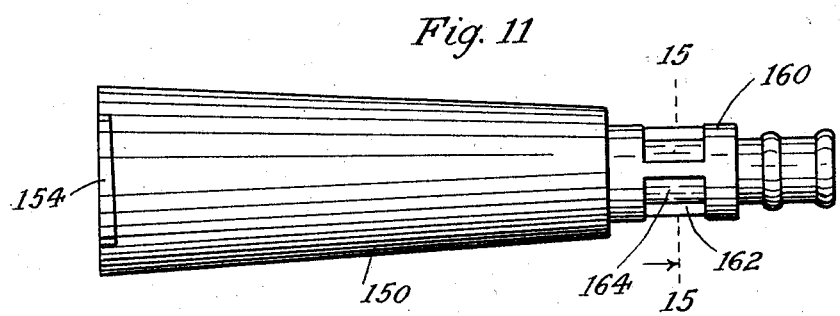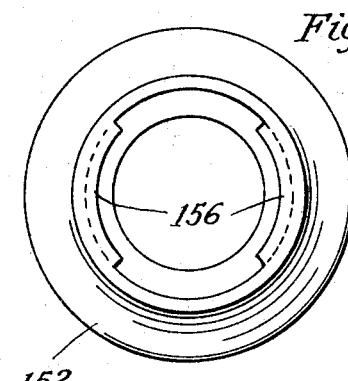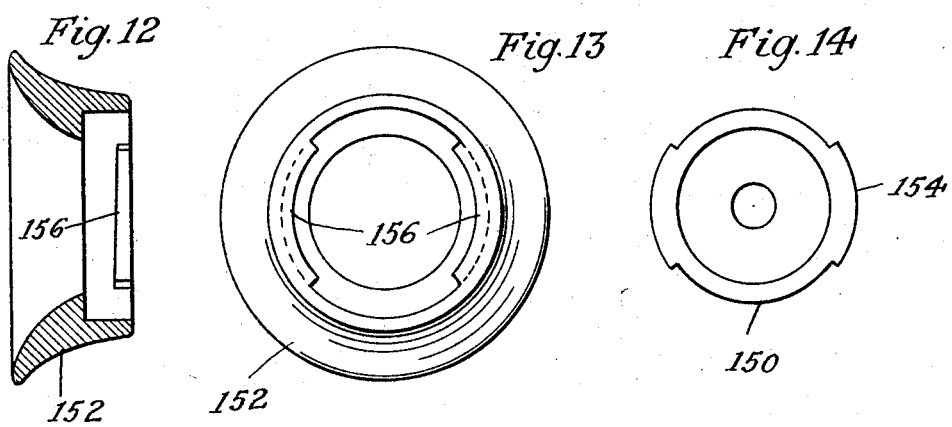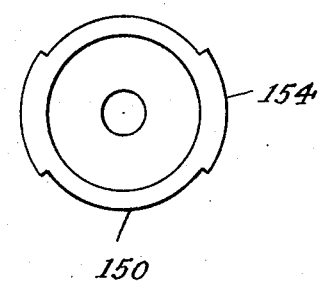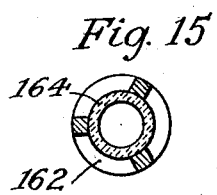

UNITED STATES PATENT OFFICE.

EDWARD J. O'LEARY, OF MINNEAPOLIS, MINNESOTA, ASSIGNOR OF ONE-HALF TO FRANK A. THURSTON AND ONE-HALF TO HENRY JUNGE, BOTH OF ST. PAUL, MINNESOTA.

MILKING APPARATUS.

1,387,510.   Specification of Letters Patent.   Patented Aug. 16, 1921.

Application filed May 31, 1919. Serial No. 300,917.

*To all whom it may concern:*

Be it known that I, EDWARD J. O'LEARY, a citizen of the United States, residing at Minneapolis, in the county of Hennepin and State of Minnesota, have invented certain new and useful Improvements in Milking Apparatus, of which the following is a specification.

My invention relates to milking apparatus and has for its object to provide apparatus in which a substantially constant degree of vacuum is maintained in the milk pail or receptacle into which the milk is drawn from the cow. More particularly my invention relates to mechanism for producing pulsations in the milk tube without materially affecting the degree of vacuum in the milk pail, and a further object is to construct this mechanism so that the milk will pass directly to the pail without passing through the pulsating mechanism. Another object is to provide a construction of teat cup in which the operator can see at a glance the flow of milk from each quarter.

The full objects and advantages of my invention will appear in connection with the detailed description thereof and the novel features embodied in my inventive idea will be particularly pointed out in the claims.

Referring to the accompanyng drawings which illustrate the application of my invention,—

Figure 1 is a front view of my device applied to a milk pail. Fig. 2 is a side elevational view of the device removed from the milk pail. Fig. 3 is a view corresponding to Fig. 2 and in vertical section. Fig. 4 is a view in section on the line 4—4 of Fig. 3. Fig. 5 is a view similar to Fig. 4 but partly in side elevation and showing the piston in a different position. Fig. 6 is a view in section on the line 6—6 of Fig. 3. Fig. 7 is a view in section on the line 7—7 of Fig. 3. Fig. 8 is a view in section on the line 8—8 of Fig. 3. Fig. 9 is a top plan view of the valve casing. Fig. 10 is a longitudinal sectional view of a teat cup. Fig. 11 is a side elevational view thereof. Fig. 12 is a sectional view of the detachable cup member. Fig. 13 is an end view of the detachable cup member. Fig. 14 is an end view of the tubular portion shown in Fig. 11. Fig. 15 is a cross section on the line 15—15 of Fig. 11.

Referring to the construction shown in the drawings, 16 designates a milk pail which is provided with a removable cover 18 having a flange 20 adapted to fit down into the top of the pail, an air-tight joint between the cover and the pail being formed by a rubber gasket 22, as appears from Figs. 1 and 5. A short tube or nipple 24 is screwed into the cover so as to communicate with the interior of the pail and this nipple is connected by a flexible tube 26 with any suitable suction device such as a vacuum tank and pump, it being understood that any desired number of milking devices may be connected by flexible tubes like the tube 26 to a pipe leading to the vacuum device. A horizontal cylinder 28 is attached to the top of the cover 18 in any suitable manner, as by screws 30. This cylinder is screw-threaded at each end to receive the internally-threaded caps 32, which are preferably knurled at 34 so that they may be readily turned on and off. Each cap 32 is provided with an externally screw-threaded boss 36 having a tapered opening 38. A small cap 40, preferably knurled at its outer end, is adapted to be screw-threaded upon each boss 36 and the caps 40 are each shown as provided with two openings 42 to admit air at atmospheric pressure to the cylinder. The caps 40 are also provided with pins 44 which act as needle valves in connection with the tapered openings 38 to control the supply of air according to the extent to which the caps 40 are screwed to the right or left, and a coil spring 46 is interposed between the cap and the boss to hold the cap in its adjusted position. A piston member has its two end portions 48 machined to snugly fit in the cylinder and the intermediate portion of the piston member is reduced so that the two end portions are connected by a web 50 shown in cross-section in Fig. 3. The two piston ends are preferably partly hollow, as indicated at 47 in Fig. 4, and the lower portions have curved projections at 49 which limit the travel of the piston member by engaging the caps 32. A solid rod 52 extends slidably and longitudinally through the center of the piston member and protrudes at each end thereof. As best shown in Fig. 4, two toggle links 54 are pivoted at 56 to the web 50 and the outer ends of these links are connected by coiled springs 58 attached to pins 60 extending out from each side of the links as shown in Fig. 3. The inner ends of the toggle links are slotted and pivotally attached to a headed pin or screw 62 secured to the rod 52, the end of the pin being provided with a slot within which fits a small rod 64 extending between the piston heads and by means of which the pin is guided and the rod 52 prevented from turning. As soon as the movement of the rod 52 carries the toggle links over dead center the springs 58 complete the movement of this rod lengthwise of the piston member with a quick snappy action. The rod has secured to each of its ends an upwardly-extended arm 66 for a purpose which will presently appear. Slidably mounted in holes extending through the piston heads 48 is a tube 68 having enlarged closed ends, as best shown in Fig. 4. This tube is provided with a hole 70 midway of its length adapted to communicate with the space between the piston heads 48 no matter whether the tube is pushed toward the left or toward the right. Near each end of this tube is a port 72. When the tube is pushed toward the right, as shown in Fig. 4, the left-hand port is closed and the right-hand port communicates with the space at the right-hand end of the cylinder. When the tube is pushed to the left, as shown in Fig. 5, the reverse arrangement is produced. When the piston is in the position shown in Fig. 4 and is moving toward the right, the head of the rod 52 first comes into contact with the right-hand end of the cylinder, thereby stopping the movement of the rod while the piston still continues to move to the right. This has the effect of moving the rod 52 to the left relatively to the piston and carries the toggle links from the position shown in Fig. 4 to the position shown in Fig. 5, thus reversing the direction of travel of the piston, as will presently appear. When this rod moves to the left under the influence of the springs 58, the right-hand arm 66 strikes the end of the tube 68 and pushes it to the left, thereby closing the right-hand port 72 and opening the left-hand port, also designated 72. The intermediate space between the piston heads is constantly subjected to suction, and hence when the tube 68 is moved to the position shown in Fig. 5 suction occurs through the opening 70 and left-hand port 72, creating a vacuum at the left-hand end of the cylinder. Air at atmospheric pressure enters the right-hand opening 38 and the piston therefore moves toward the left. When the left-hand end of the rod 52 strikes the end of the cylinder the position of the toggle links starts to change. The links pass over dead center at about the time the arm comes into contact with the hollow tube 68, whereupon the springs 58 give a quick movement to the tube and a speedy reversal of movement of the piston. It is evident that the speed of the piston may be regulated and controlled by turning the caps 40, and if desired the speed in either direction may be caused to be different from what it is in the other direction. Any desired length of release or pulsation may thus be given to each side of the device independently of the other side. The wall at the bottom of the intermediate space in the cylinder has a slot registering with a similar slot in the cover 18, the conjoint slot thus produced being designated by the character 74. A valve casing 76 is secured to the underside of the cover by screws 78, as shown in Fig. 3, which passes through the cover 18 into screw-threaded holes in the casing. The top of this casing is shown in Fig. 9 and is provided with two recesses 80 at diagonally-opposite corners adapted to fit over two pins 82 depending from the under side of the cover. The valve casing may thus be readily placed in proper position after it has been removed for cleaning. The valve casing is provided with a slot 84 in register with the slot 74, and through these slots extends a rocker arm 86, the upper end of which enters the intermediate space of the cylinder into position to be engaged and operated by the piston heads 48. From the slot 84 a slot 85 extends to the end of the casing to maintain communication at all times with the interior of the pail. The rocker arm is oscillated by the reciprocation of the piston member and the arm works between two bars 87 extending between the piston heads 48, so that the piston is prevented from rotating in the cylinder. The rocker arm is secured to a small plug 88 rotatably mounted in the rear end of the casing 76, this plug being provided upon its inner end with a slot 90 into which is adapted to fit a tongue 92 on the rear end of a rotatable valve member 94, this end of the valve member being solid and provided with an annular groove 96 for engagement by a spring-pressed pin 98 as shown in Fig. 6 mounted in the casing, and by which the valve member is removably held in place. The front end of the valve member is solid and is provided with a knurled head 100 by means of which it may be turned when inserting it into the casing so as to cause the tongue 92 to engage the groove 90, the tongue and the groove being slightly off center so that they cannot be engaged in the wrong position. The valve proper is constituted by a chambered portion 102 indicated by dotted lines in Fig. 3. This chambered portion is provided at the top with a slot 104, the front end of which is enlarged to form a circular opening 106, and the bottom of the chamber is provided with two slots 108, which when the valve member is turned in one direction register with two slots 110 in the casing and communicate with the space in the pail. When the valve member is turned in the other direction the slots 108 and 110 are moved out of register. When this occurs the slot 104 comes into register with a hole 112 in the top of the casing which is in register with a hole 114 in the cover. The vacuum in the chamber 102 is thus broken without affecting the vacuum in the pail, so that the intermediate portion of the cylinder between the heads 48 is always under suction through the slots 85, 84 and 74. The opening 106 is at all times in communication with an opening 116 in the casing which registers with a hole in the cover into which is screw threaded the lower end of a member 117 which is termed a milk well. This member is best shown in Fig. 8 and is constructed as follows. At the bottom is a center hole in line with the hole 116 in the casing, and two tapering holes converge into this center hole. A tapered valve plug 118 fits into each of the tapering holes and each of these plugs has a passageway 120 which is adapted to communicate with one of a pair of nipples 122 indicated in dotted lines in Fig. 1 extending from the front of the milk well. The valve plugs are detachably secured in place by means of a screw-threaded pin 124 extending down centrally of the milk well and having its lower end engaged with grooves 126 formed in the lower ends of the plugs. By loosening the pin 124 the plugs can be readily removed for cleaning. In Fig. 8 the left-hand plug is shown in position to place the nipple which it controls in communication with the valve chamber 102, while the right-hand plug is turned into position to close the nipple which it controls and prevent communication with the valve chamber. In the latter position the passageway 120 in the valve plug comes into communication with a groove 128 in the wall of the milk well and the vacuum is thereby broken in the part of the apparatus connected to the nipple and now to be described. Each nipple 122 is connected to a flexible tube 130 intermediate the ends of which is a sight or observation device 132 consisting of a coupling containing a glass or other transparent tube, and the coupling has a number of slots around its circumference whereby the flow of milk can be seen from all angles. The outer end of each tube 130 is connected to a milk claw 134 which forms a coupling or connection with four rubber tubes 136, each of which has a teat cup 138 at its outer end. As shown in Fig. 1, the cylinder 28 has two lugs 140 secured on the top thereof and vertical arms 142 are pivotally connected to these lugs, the upper ends of these arms being connected by a handle member 144 and being provided at their sides with hooks 146 by means of which the teat cups may be suspended when not in use, in order to keep them from the ground. One of the pivotal points for the arms 142 is constituted by a screw 148 upon loosening which the handle may be turned down against the cylinder so as to be out of the way. The construction of the teat cups is shown in Figs. 10 to 15. A conical member 150 has a cup member 152 adapted to be detachably secured thereto by a bayonet locking device consisting of inclined lugs 154 on the conical member fitting into inclined slots 156 in the cup member. A gasket 158 is held between the two members, this gasket being adapted to receive and closely fit upon the teat of the cow. The other end of the conical member is internally threaded to receive the externally-threaded ends of the member 160 provided with a number of slots 162, as shown three of these slots being provided. The other end of the member 160 is reduced and receives one of the tubes 136. A short glass tube or other transparent tube fits within the slotted portion of the member 160 to form a sight or observation device similar to that shown at 132. It will be noticed that the device is duplex, whereby two cows can be milked at one time by the same device. The flow of milk from each cow can be observed at 132, while the flow of milk from each quarter can be observed through one of the slots 162 with which the various teat cups are provided.

The operation and advantages of my invention have been to a large extent stated in the foregoing description. The milk pail or receptacle and the intermediate space in the cylinder are maintained under vacuum as long as the device is in operation. The reciprocating piston causes the valve to rock or oscillate and alternately create and relieve a vacuum within the teat cups, since in one position of the valve the teat cups are in connection with the interior of the receptacle and in the other position of the valve the teat cups are cut off from communication with the interior of the receptacle and the vacuum is relieved on account of communication with the outside air being established through the holes 112 and 114. The device may be readily cleaned since the milk cannot get into the cylinder but goes directly through the milk well and valve and these are readily removable.

I claim:

1. A milking apparatus comprising a milk receptacle, teat cups adapted to be connected with said receptacle, a cylinder attached to the cover of said receptacle, a piston having its two ends fitting said cylinder and having a reduced portion between said ends, means for constantly maintaining a vacuum in said receptacle, a passageway connecting said receptacle and the reduced portion of said piston at all positions of the latter, means for alternately establishing communication between the ends of the cylinder and said reduced portion of the piston whereby said piston is reciprocated, and means operated by said piston for alternately creating and relieving a vacuum within said teat cups.

2. A milking apparatus comprising a milk receptacle, teat cups adapted to be connected with said receptacle, a cylinder attached to the cover of said receptacle, a piston having its two ends fitting said cylinder and having a reduced portion between said ends, a tube closed except for three ports and being slidably mounted in said piston, one of said ports being always in communication with said reduced portion of the piston and the other two ports being in communication with one or the other of the ends of said cylinder according to the position of said tube in said piston, means for constantly maintaining a vacuum in said receptacle, a passageway connecting said receptacle and the reduced portion of said piston at all positions of the latter, means for shifting said tube from one position in the piston to the other position when the piston reaches the end of its stroke whereby said piston is reversed, and means operated by said piston for alternately creating and relieving a vacuum within said teat cups.

3. A milking apparatus comprising a milk receptacle, teat cups adapted to be connected with said receptacle, a cylinder attached to the cover of said receptacle, a piston having its two ends fitting said cylinder and having a reduced portion between said ends, a tube closed except for three ports and being slidably mounted in said piston, one of said ports being always in communication with said reduced portion of the piston and the other two ports being in communication with one or the other of the ends of said cylinder according to the position of said tube in said piston, means for constantly maintaining a vacuum in said receptacle, a passageway connecting said receptacle and the reduced portion of said piston at all positions of the latter, a rod slidably mounted in said piston, arms secured to the ends of said rod, said arms being adapted to engage said tube to shift it from one position in the piston to the other position when the piston reaches the end of its stroke whereby said piston is reversed, and means operated by said piston for alternately creating and relieving a vacuum within said teat cups.

4. A milking apparatus comprising a milk receptacle, teat cups adapted to be connected with said receptacle, a cylinder attached to the cover of said receptacle, a piston in said cylinder, means for reciprocating said piston, a valve casing attached to said cover, a valve member in said casing, an arm connected to said valve member and adapted to be oscillated by said piston to rock said valve member, means whereby a vacuum will be produced in said teat cups when said valve member is in one position, and means whereby the vacuum will be relieved when said valve member is in another position.

In testimony whereof I hereunto affix my signature.

EDWARD J. O'LEARY.